United States Patent [19]

Thatch

[11] 3,723,912

[45] Mar. 27, 1973

[54] CONSTANT RESISTANCE BRIDGED-T CIRCUIT USING TRANSMISSION LINE ELEMENTS

[75] Inventor: Raymond Allen Thatch, Middletown, N.J.

[73] Assignee: Bell Telephone Laboratories, Incorporated, Murray Hill, N.J.

[22] Filed: Mar. 27, 1972

[21] Appl. No.: 238,178

[52] U.S. Cl. ........................333/20, 328/65, 333/28, 333/31 R, 333/75, 333/84 M, 333/97 R

[51] Int. Cl. ..............................................H03h 7/14

[58] Field of Search ......333/19, 20, 28, 70 T, 29, 31, 333/73 C, 73 S, 75; 179/170 E, 170 HF; 328/56, 65

[56] References Cited

UNITED STATES PATENTS

| | | | |
|---|---|---|---|
| 2,718,622 | 9/1955 | Harkless | 333/75 X |
| 3,153,207 | 10/1964 | Brown | 333/19 X |
| 3,495,190 | 2/1970 | Ross | 333/28 |

*Primary Examiner*—Paul L. Gensler
*Attorney*—R. J. Guenther et al.

[57] ABSTRACT

A wave-shaping network of the type in which a portion of the signal is delayed and subtracted from the signal is constructed in the constant resistance bridged-T form. Delay lines terminated in resistors form the bridging and shunting members. The result is a more accurate network that allows sharp frequency cutoff with significant noise improvement.

A triaxial structure in which the output shield of the above-ground delay line also serves as the inner conductor of a transmission line greatly reduces unwanted capacitance effects. A microstrip construction is also disclosed.

7 Claims, 6 Drawing Figures

CONSTANT RESISTANCE BRIDGED-T CIRCUIT USING TRANSMISSION LINE ELEMENTS

BACKGROUND OF THE INVENTION

This invention relates to wave-shaping networks in general and particularly to repeater equalizers for communication systems. The distortion of electrical communications signals in both amplitude and phase as a function of their frequency components as they travel long distances over transmission lines has challenged the ingenuity of engineers for decades. As a result, many types of equalizing networks have been designed to compensate for this distortion. Since digital communications systems require a particularly broad frequency band, however, their pulse signals suffer particularly severe distortion. Although the pulses may be regenerated in ideal waveform at each repeater, they must first be separated from the noise so that they may be recognized as pulses before regeneration. Equalizers are therefore normally used at the input to the repeaters in order to extend the allowable distance between repeaters. An ideal equalizer would compensate for all distortion within the transmission band and pass nothing outside of the band which merely contributes to overall noise.

Because of the severe distortion characteristic of a broadband transmission line channel, equalizers have become complex. Modern equalizers for digital transmission lines require several cascaded frequency selective sections and many components. With all of their complexity, however, they still pass considerable noise, which tends to mask the intelligence transmitted, and shorten the allowable distance between repeaters.

An object of this invention is a novel wave-shaping circuit for broadband use.

A second object is a novel repeater equalizer section for wideband digital transmission lines.

Another object is an equalizer with considerably improved noise rejection characteristics.

Still another object is a repeater equalizer that is readily adaptable to thin-film technology.

SUMMARY OF THE INVENTION

The wave-shaping network of this invention is of the constant resistance bridged-T general form. A pair of resistors each having a resistance $R_0$ is connected in series between input and output. A first delay line having a characteristic impedance of $R_0$ and terminated in a first resistance $R_1$ is connected between input and output bridging the $R_0$ pair. A second delay line having a characteristic impedance of $R_0$ and terminated in a second resistor $R_2$ is connected between the junction of the $R_0$ resistors and ground. Both delay lines are of the same length, and the values of the terminating resistors satisfy the equation $R_1R_2 = R_0^2$.

For additional shielding, the first delay line may be encased in a shield to form a transmission line with a characteristic impedance of $R_0$. Alternatively, the network may be constructed in microstrip form.

DETAILED DESCRIPTION

Figure 1:
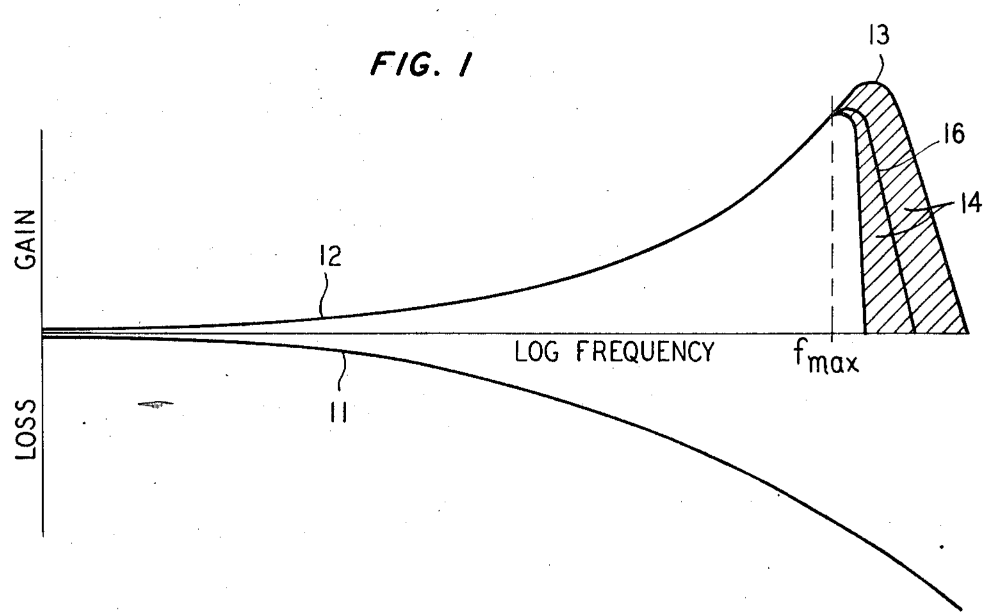
FIG. 1 is a plot of typical transmission line insertion loss and desired repeater gain against the logarithm of frequency.

The problem solved by this invention can be better understood with reference to the curves of FIG. 1, which are gain and loss characteristics. Curve 11 is a plot of typical transmission line insertion loss against the logarithm of frequency. For a given length of line, the higher the frequency, the greater the insertion loss. Curve 12, being a mirror image of curve 11 up to a frequency $f_{max}$, the highest signal frequency component, is therefore an ideal equalizer characteristic to completely offset the loss of the transmission line. The ideal gain curve cuts off sharply above $f_{max}$ because any gain at any frequency beyond the actual signal frequencies increases noise without increasing the signal itself, thereby detracting from the communication.

The traditional frequency domain approach to achieving this ideal characteristic by cascading LC filter sections according to the poles and zeros of the LaPlace transforms of their respective transfer functions is quite successful up to the vicinity of $f_{max}$. At this point, however, several poles are required to effect sharp cutoff. Because the attendant nonlinear phase shift through these pole-producing sections is great, satisfactory performance requires considerable gain beyond $f_{max}$, as illustrated by curve 13. All of the shaded area 14 between curves 12 and 13 is therefore required, even though it produces considerable noise.

Equalizer sections constructed according to the principles of my invention, on the other hand, do not require the multiple poles for cutoff and do not produce the highly nonlinear phase shift in the vicinity of cutoff. Cutoff, therefore, can be much sharper, as illustrated by curve 16, and noise correspondingly greatly reduced.

Figure 2:
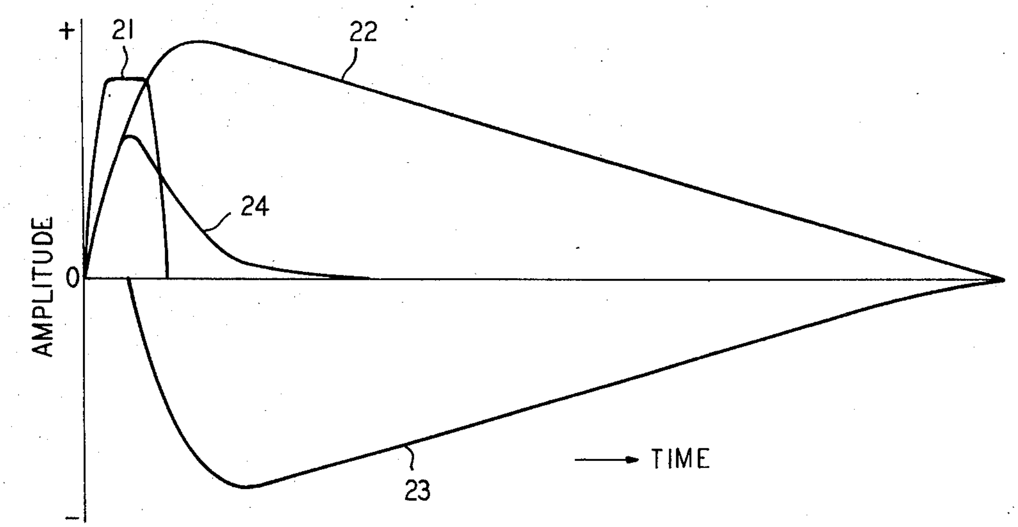
FIG. 2 is a time plot showing a typical digital pulse distorted by a transmission line and the effect of an equalizer constructed according to the invention.

The design approach of frequency selective networks according to this invention is a time domain approach and can perhaps best be explained with reference to the curves of FIG. 2. These curves are plots of signal amplitude against time, and are hence waveforms. Curve 21 is easily recognized as a single digital pulse as it is originally transmitted. Waveform 22 is more or less typical of the single digital pulse after it has traveled a considerable distance along a coaxial transmission line. No attempt has been made to illustrate any relative amplitude between curves 21 and 22.

Waveform 23 is a duplicate of waveform 22 that has been delayed and inverted and multiplied by a large fraction to somewhat diminish its amplitude. When the waveforms 22 and 23 are added together, the resulting waveform 24 is a good first approximation of the original pulse. It can easily be seen that a series of pulses originally separated by empty time slots, that is, a 1010 series, for example, can become merged and confused when the waveforms are distorted by transmission to resemble waveform 22. On the other hand, after even a single section that produces waveforms similar to waveform 24, the pulses are much more recognizable. As with the pole-zero designed equalizers, several sections may be connected in tandem to improve the accuracy.

Frequency selective networks embracing my invention effectively perform the same operation--the received signal is split and one half is delayed and somewhat diminished, then inverted, so that it may be subtracted from the other half. The transfer function provided is of the form $$g(\omega) = \tfrac{1}{2}(1 \pm Ke^{-j\omega T}) \quad (1)$$

where the value of $T$ is the amount of the delay and that of $K$ the relative amplitude between the received signal and the fraction that is subtracted (waveforms 22 and 23, respectively). Note in Equation (1) the delayed signal can be added as well as subtracted. This has been found useful in constructing networks to eliminate noise without phase distortion.

The technique of delaying and adding signal portions in order to provide signal correction is not in itself new. Several well-known transversal filter networks use a delay line which is tapped at several places along its length to provide several signals with differing amounts of phase shift. Different portions of each of the phase shifted signals are then summed to produce the corrected signal. The major problem with this type network, however, is that of accuracy. When one number is subtracted from another of almost equal magnitude, the accuracy is very poor. The delay and subtract technique has therefore been limited to relatively small corrections or to systems where the amplitudes of signal portions to be subtracted can be instantaneously varied by feedback.

I have found, however, that the desired transfer function can be accurately realized by a novel variation of the well-known constant resistance bridged-T network. As previously known, this type network consisted of a series pair of resistors of value $R_0$, the impedance of the source and load, and the characteristic impedance of the line, bridged by a capacitor and having an inductive shunt from the junction of the resistors to ground. As its name implies, this network provides a constant resistance over the frequency band.

Figure 3:
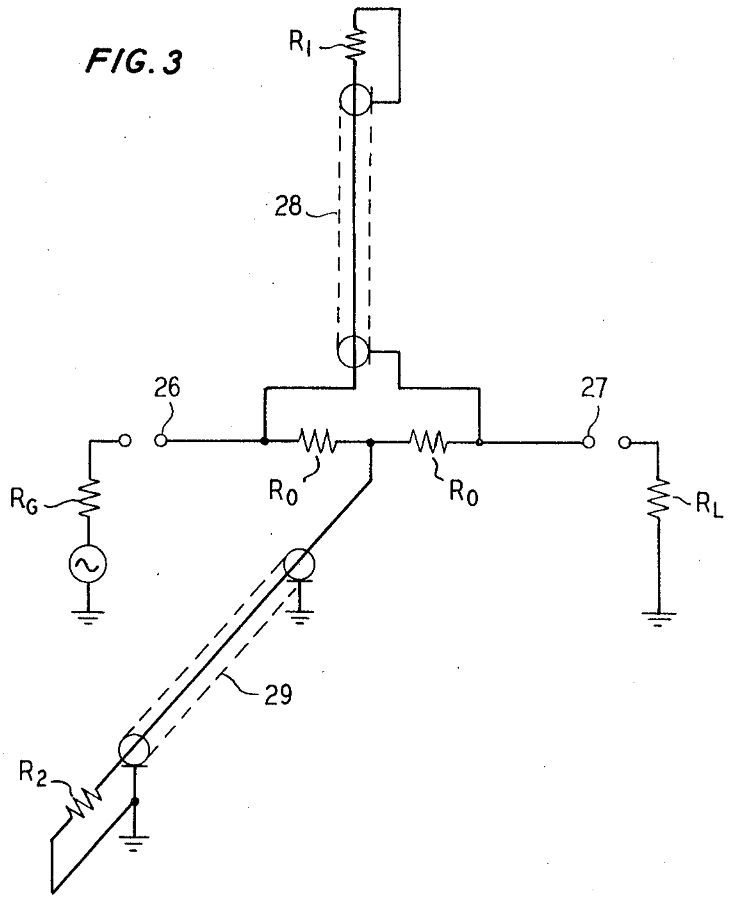
FIG. 3 is a schematic diagram of a simple embodiment of the invention.

My novel variation as shown in FIG. 3 also includes a series pair of resistors of value $R_0$ connected between the network input 26 and output 27. The bridging capacitor however, has been replaced by a delay line 28 terminated in a resistance $R_1$, and the shunting inductor has been replaced by another delay line 29 terminated in a resistor $R_2$.

In order to keep the constant resistance network features, terminated delay lines 28 and 29 must be duals. That is, the characteristic impedance of each line is $R_0$, their lengths are equal to produce equal delays, and the values of $R_1$ and $R_2$ are chosen so that $$R_1R_2 = R_0^2 \quad (2)$$

The only additional equations needed to design a constant resistance network with the transfer function given by Equation (1) are $$K = (R_1 - R_0)/(R_1 + R_0) \quad (3)$$

and $$T = 2\pi \quad (4)$$

where $\pi$ is the one way delay introduced by each delay line and is calculated by $$\pi = \lambda / v_0 \quad (5)$$

where $\lambda$ is the length of the line in meters and $v_0$ is the group velocity in meters/second. As is well known, $$v_0 = \frac{1}{\sqrt{\mu\epsilon}} \quad (6)$$

where $\mu$ is the permeability and $\epsilon$ the permittivity of the dielectric. The particular values for $K$ and $T$ to produce the desired improvement in the waveshape of the signals can be determined graphically as in FIG. 2, or can easily be computed by iterative computations of instantaneous signal amplitudes according to well-known methods.

Figure 4:
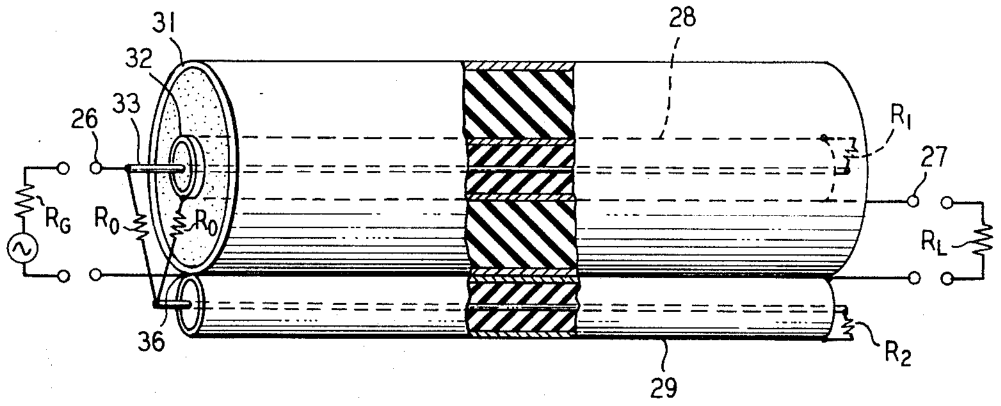
FIG. 4 is a partly pictorial, partly schematic diagram of an embodiment of the invention employing sections of coaxial line.
Figure 5:
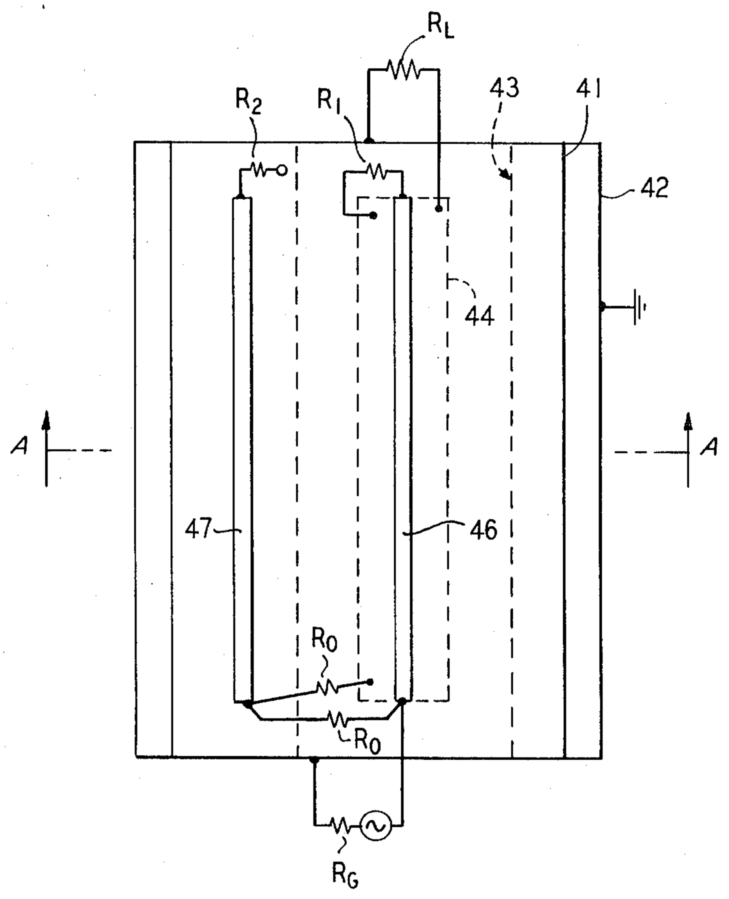
FIG. 5 is a partly schematic, partly pictorial diagram of an embodiment of the invention employing strip line construction techniques.
Figure 5A:
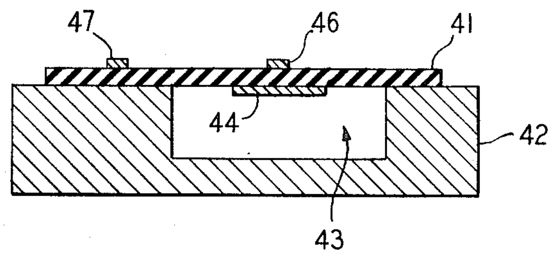
FIG. 5A is a cross-sectional view taken through Section AA of FIG. 5.

Networks can be constructed and satisfactorily operated using separate coaxial lines for lines 28 and 29 of FIG. 3. At high frequencies, however, the relatively large capacitance to ground of ungrounded line 28 presents appreciable difficulties that can produce radiation and unwanted pickup and can upset the output impedance match to the load. One handy structure for overcoming these difficulties is illustrated in FIG. 4. In this structure, bridging coaxial line 28 and shunting coaxial line 29 are terminated in resistors $R_1$ and $R_2$, respectively, as previously described. The whole of line 28 is itself however, encased within an outer shield 31 to form a triaxial structure. Outer conductor 32 of line 28, does double duty, therefore, serving as the inner conductor of an additional transmission line formed with outer shield 31. The dimensions and dielectric of this transmission line are also chosen to produce a characteristic impedance of $R_0$. Conductor 32 must of course be of sufficient thickness so that at the frequencies where currents in the delay line and in the main line would cause noticeable interference, the skin effect keeps the currents separate. The outer conductor delay line 29 is grounded to outer conductor 31 at point 36. This structure is self-shielding as all outer conductors are at ground potential, and stray capacitance is kept to a minimum. An adaptation of the triaxial structure of FIG. 4 for microstrip construction is shown in FIG. 5 of which FIG. 5A is a cross-sectional view through Section AA. In this structure, a sheet of dielectric insulation 41 is mounted on a metal base 42 into which a channel 43 has been formed. On the underside of insulator 41 is mounted a metallic strip 44 centered between the walls of channel 43. Two additional metallic strips 46 and 47, respectively, are mounted on top of insulator 41. Strip 46 is centered above strip 44 and together with strip 44 forms the bridging delay line terminated in resistor $R_1$. The thickness of insulator 41 and the width of strip 46 are chosen to provide a characteristic impedance of $R_0$.

Strip 47 is mounted over a solid part of metal base 42 and together with metal base 42 forms the shunting delay line terminating in resistor $R_2$. Strip 47 is located far enough away from strip 44 to reduce capacitive coupling to a harmless level. The thickness of strip 47 and insulator 41 also provide a characteristic impedance of $R_0$ ohms and the length λ of lines 46 and 47 is chosen to fit Equation (5). Finally, as in the case of conductor 32 of the triaxial structure of FIG. 4, strip 44 does double duty. It forms an additional line with base 42. The thickness of strip 44 and dimensions of channel 43 are chosen to set the characteristic impedance at $R_0$. Channel 43 may be filled with air or any other convenient dielectric, the dimensions adjusted accordingly. This structure also provides effective shielding for the above-ground line.

An accurate wave-shaping network that can produce a sharp frequency cutoff with linear phase shift can therefore be constructed in several convenient forms. For transmission equalizer use with its delay lines terminated in resistors the network provides a transfer function of the form $G(\omega) = ½(1 \pm Ke^{-j\omega T})$. Additional versatility can be gained for such uses as differentiator, low-pass filter and one-tap transversal equalizer if the delay lines are terminated in complex impedances and the constant resistance condition is maintained ($Z_1Z_2 = R_0^2$). This provides the transfer function $G(\omega) = ½(1 \pm K(\omega)e^{-j\omega T})$ where $K(\omega)$ is a function of frequency. The coaxial line, the triaxial structure, and the microstrip constructions are of course all readily adaptable to this change.

What is claimed is:

1. An electrical wave-shaping network comprising an input terminal for connection to a signal source, an output terminal for connection to a load having an impedance $R_0$, a common terminal, a pair of resistors each having a resistance $R_0$ connected in series between said input and said output terminals, a first delay line having its input connected between said input and output terminals and having its output terminated by a third resistor having a value $R_1$, and a second delay line having its input connected between the junction of resistors and said common terminal, and having its output terminated in a fourth resistor having a value $R_2$, said first and second delay lines each having characteristic impedances substantially equal to the value $R_0$ and the values of said third and fourth resistors substantially satisfying the equation $R_1R_2 = R_0^2$.

2. An electrical wave-shaping network as in claim 1 wherein said first and second delay lines are terminated in complex impedances $Z_1$ and $Z_2$, respectively, the values of said complex impedances substantially satisfying the equation $Z_1Z_2 = R_0^2$.

3. An electrical wave-shaping network as in claim 1 in combination with at least one additional similar wave-shaping network connected in tandem therewith.

4. An electrical wave-shaping network as in claim 1 wherein said common terminal comprises a base member, said first delay line comprises a dielectric spacing member mounted on said base member and first and second metallic strips mounted on said spacing member, and said second delay line comprises said base member and a third metallic strip mounted on said spacing member.

5. An electrical wave-shaping network as in claim 4 wherein said base member has a recess, said second metallic strip being positioned within said recess to form together with said base member a transmission line having a characteristic impedance of substantially $R_0$.

6. An electrical wave-shaping network as in claim 1 wherein said first and second delay lines comprise equal lengths of coaxial line.

7. An electrical wave-shaping network as in claim 6 including a shielding member connected to said common terminal and encircling said first delay line, said shielding member forming together with the outer member of said first coaxial delay line, a third coaxial line having a characteristic impedance of substantially $R_0$.

* * * * *